July 4, 1950            S. E. HILBLOM            2,513,938

INNER SHOE FOR RECIPROCATING MOWERS

Filed Sept. 19, 1947            2 Sheets-Sheet 1

INVENTOR.
Samuel E. Hilblom
BY Paul O. Pippel
Atty.

Patented July 4, 1950

2,513,938

UNITED STATES PATENT OFFICE 2,513,938

INNER SHOE FOR RECIPROCATING MOWERS

Samuel E. Hilblom, Chicago, Ill.

Application September 19, 1947, Serial No. 774,921

15 Claims. (Cl. 56—25)

1

The application for this invention is a continuation in part of copending application Serial No. 553,581, filed September 11, 1944, now abandoned.

The invention relates to an inner shoe construction for a mower and has for its principal object the provision of an improved shoe construction including means for connecting the shoe to a support and for connecting the shoe also to a laterally extending cutter bar. The invention finds its greatest use in connection with tractor-mounted mowers of the type in which the tractor carries a frame including a laterally extending support, to the outer or grassward end of which is connected an inner shoe and runner which in turn provides means for connecting the laterally extending cutter bar. In mowers of this type the sickle or knife is driven from the tractor power take-off shaft and there must be provided driving connections therefor, including driving means carried at least in part by the inner shoe. The difficulties characteristic of the design of a suitable inner shoe are more particularly emphasized in those instances in which the mower construction features cutting mechanism that is releasable from its supporting structure upon the striking of an obstruction, in which case the inner shoe construction must accommodate appropriate parts and must include releasable latch mechanism for normally holding the cutter bar in operative position.

It is an important object of the invention to provide an improved inner shoe construction comprising relatively few structural parts, one of which is connected to supporting structure, such as a coupling bar or frame, and the other of which is connected to the cutter bar. Another object is to provide the structural elements in the form of a pair of related shell-like members, each having a closed stubbleward side and an open grassward side, the closed side of one shell providing for attachment thereof to a frame or vehicle and the open side thereof providing for the housing of a portion of the driving means and also for the attachment of the laterally extending cutter bar.

The foregoing and other important objects and desirable features of the invention will become apparent to those skilled in the art as the disclosure is more fully made in the following detailed description of a preferred embodiment of the invention as illustrated in the accompanying sheets of drawings, in which:

Figure 1 is a fragmentary plan view illustrating the improved shoe construction in conjunction with supporting and driving elements.

2

Figure 3:
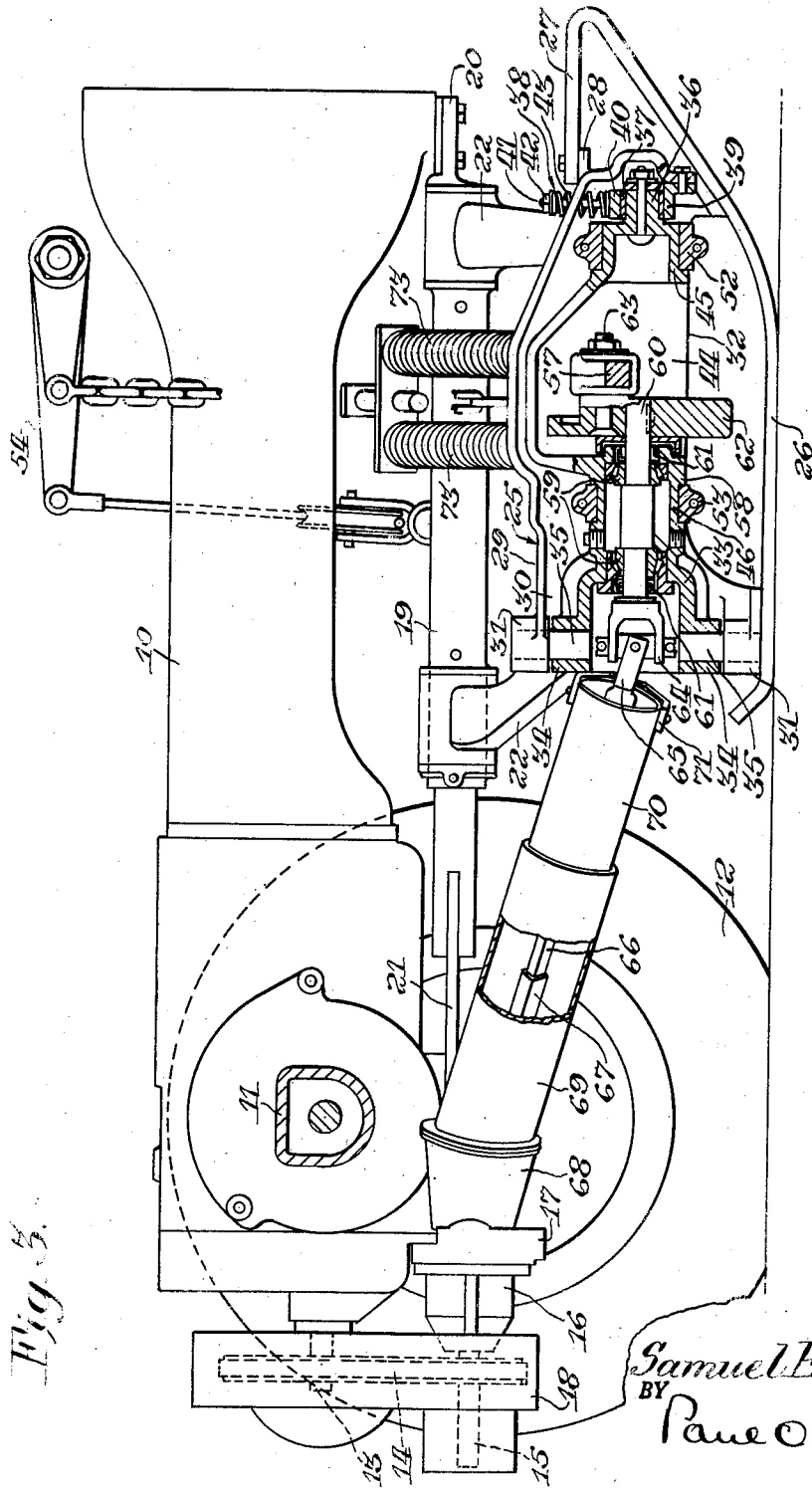
Figure 3 is a view of the shoe construction as seen along the line 3—3 of Figure 1, together with a portion of a tractor shown in side elevation in the background.

The general tractor and supporting structure are shown in the copending application mentioned above and only limited reference thereto will be had here. The tractor includes a longitudinal body 10 having a rear axle structure 11 carried on rear wheels 12 (only one of which is shown in Figure 3). The forward portion of the tractor has been omitted.

The tractor includes at its rear end a rearwardly extending power take-off shaft 13, to which is keyed a pulley connected by a belt 14 to a pulley keyed to a driven shaft 15. The driven shaft 15 is carried in a suitable bearing 16 supported by a bracket 17 below the rear portion of the tractor. Appropriate shielding 18 encloses the shafts 13 and 15, the pulleys and the driving belt 14.

Figure 1:
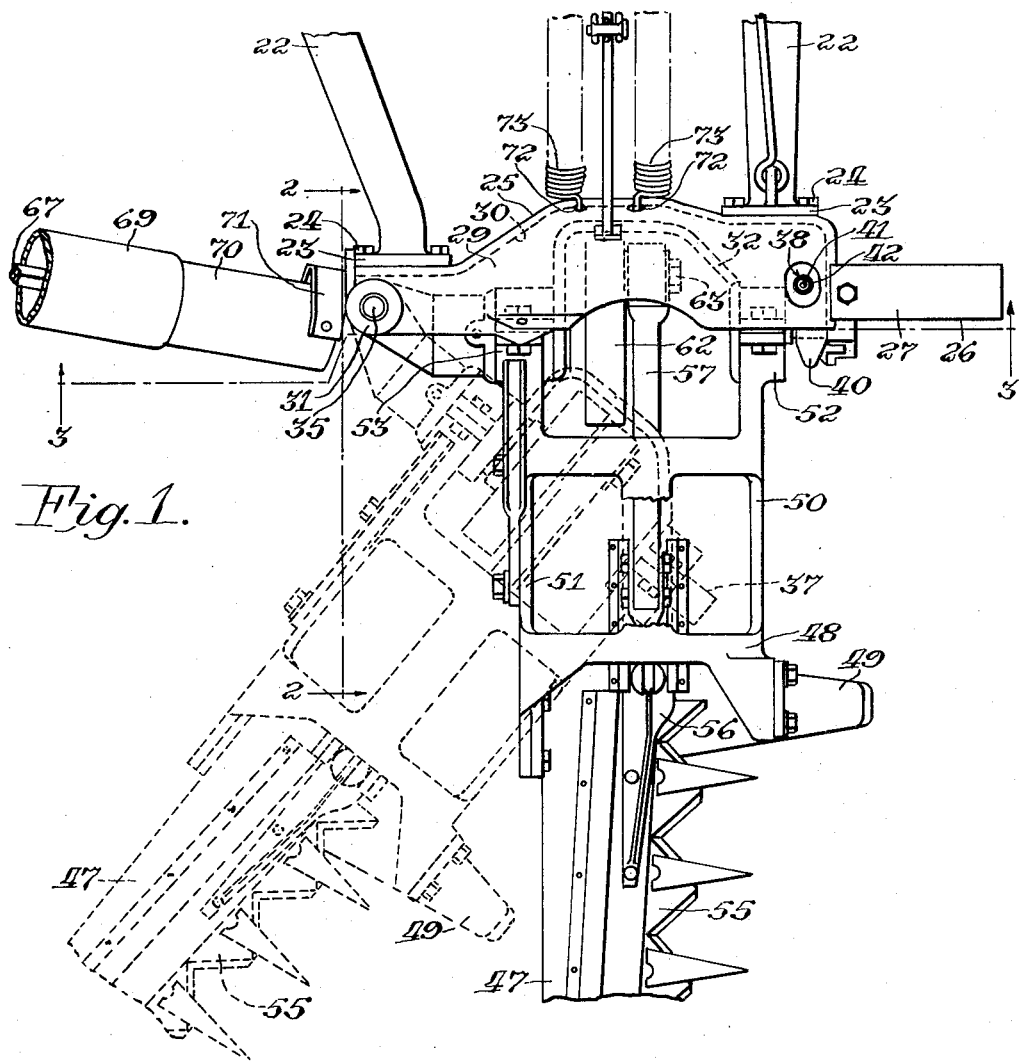
Figure 2:
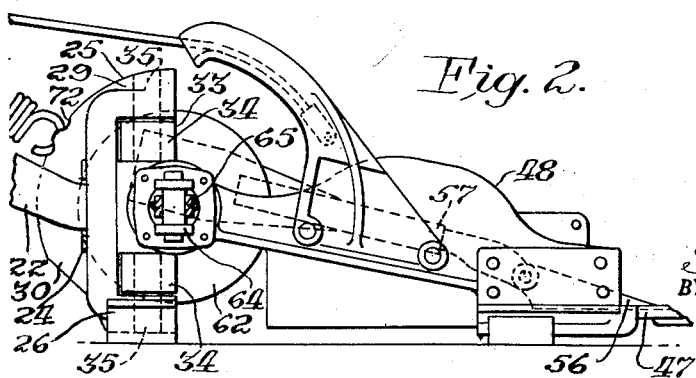
Figure 2 is a view of the structure shown in Figure 1 taken substantially along the line 2—2 of Figure 1.

The tractor body 10 carries therebelow a longitudinally extending tubular support 19, the forward end of which includes a plate 20 secured to an under portion of the tractor body, and the rearward end of which includes a larger plate 21 preferably secured to an under portion of the rear part of the tractor body. The support 19 has pivoted thereto intermediate its ends the inner or stubbleward ends of a pair of laterally outwardly or grasswardly extending supporting or frame arms 22. The outer ends of these arms are flanged at 23 and are secured by means of cap screws 24 to a shell-like supporting member preferably in the form of a casting 25. As shown in Figure 3, the shell casting 25 includes an intermediate portion that is semi-circular in cross-section. The casting extends longitudinally as respects the direction of travel of the mower and is secured at its lower rear end portion to a ground-engaging runner 26. The forward portion of the runner inclines upwardly and is bent back at 27, at which point it is secured to an ear 28 on a forward portion of the casting 25. The structure of the casting 25 is such that it includes an upper or top wall 29 and an inner side wall 30 (Figure 1).

The rear end of the casting 25 is bifurcated to provide a pair of vertically spaced alined bearing portions 31 providing a pivot on a vertical axis. A second shell, also preferably in the form of a casting, is designated by the numeral 32 and has a rear end portion in the form of a yoke 33 providing vertically spaced apart bearing portions 34 alined with the bearing portions 31 on the first shell 25. A pair of pivot pins 35 connects the bearing portions 34 and 31, so that the casting or shell 32 may have horizontal swinging movement with respect to the casting or shell 25 about the vertical axis through the pivot pins 35 and bearings 31 and 34. The forward portion of the casting 32 includes a longitudinal projection 36 which carries thereon a roller 37. This roller is engageable by a spring-pressed releasable device indicated generally by the numeral 38. This device comprises a lower or fixed portion 39 on the casting 25 and a hinged upper jaw 40 pivoted or otherwise movably carried by the casting 25. A pin 41 extends vertically upwardly and loosely through the upper jaw 40. The upper end of the pin is threaded and carries a nut 42 between which and the upper jaw 40 is disposed a compression spring 43, the function of which is to urge the jaw 40 downwardly and into engagement with the roller 37 on the front of the second shell 32.

The second shell or casting includes an intermediate semi-circular portion 44 which is integral with a forward bearing 45 and a rear bearing 46. The bearings 45 and 46 are alined on a longitudinal horizontal axis.

The mower further includes a laterally outwardly extending cutter bar 47, the inner end of which includes a frame structure 48 having a shoe 49 and a pair of inwardly extending frame members 50 and 51. The inner end of the frame member 50 is provided with a split bearing 52 which embraces the bearing 45 on the casting 32. The rear frame member 51 is provided with a similar split bearing 53 which embraces the rear bearing 46 of the casting 32. By means of the bearings 45—46, 52—53, the cutter bar 47 is carried by the casting 32 for vertical swinging movement about the longitudinal horizontal axis of the bearings. This movement is desirable for the purposes of allowing the cutter bar to follow uneven ground contour and for the further purpose of providing for raising and lowering of the cutter bar from operating to transport position, one form of lifting means being designated generally by the numeral 54. The details of the lifting structure are disclosed in the copending application referred to above.

The cutter bar 47 carries therein a reciprocating knife or sickle 55, the inner end of which is rigidly connected to a knife head 56 which is in turn connected to a transverse pitman 57. That portion of the second shell or casting 32 just rearwardly of the generally semi-cylindrical portion 44 is provided as a housing 58 including longitudinally spaced bearings 59 for journalling a short longitudinal drive shaft 60. The housing 58 is adapted to contain a supply of lubricant and is closed at opposite ends by appropriate lubricant seals 61 that encircle opposite projecting ends of the shaft 60. The forward end of the shaft 60 has keyed or otherwise secured thereto a fly-wheel 62 provided with an eccentric crank 63. This crank is connected in the usual manner to the pitman 57, thereby providing means for translating rotary movement of the shaft 60 to reciprocating movement of the knife or sickle 55. The rear end of the shaft 60 is provided with a universal joint yoke 64. At this point it should be noted that the axis of the shaft 60 is coincident with the axis through the bearings 45 and 46, so that vertical swinging movement of the cutter bar about this longitudinal horizontal axis will not in any manner affect the operation of the driving shaft 60 and pitman 57.

The universal joint yoke 64 at the rear end of the shaft 60 is universally connected to a second universal joint yoke 65 at the forward lower end of a rearwardly and upwardly inclining drive shaft 66. The rear portion of the shaft 66 is preferably square in cross-section and is telescopic within an internally square portion of a complementary drive shaft 67, the rear end of which is associated by means of an appropriate universal joint (not shown) with the forward end of the driving shaft 15. A forwardly extending bell housing 68 forms part of the supporting bracket 17 for the shaft 15 and includes a forward flanged end to which is secured a rear flanged end of a forwardly and downwardly inclined cylindrical shield 69. A second shield 70 of reduced diameter fits telescopically within the forward end portion of the shield 69. The forward end of the shield 70 is carried by a suitable bracket 71 secured to the rear portion of the casting 25.

The telescopic relation between the shaft parts 66 and 67 and the shield parts 69 and 70 is provided to accommodate vertical movement of the mower as the runner 26 encounters irregularities in the ground contour, the mower being permitted to have such movement by means of the pivot connection of the frame members 22 to the longitudinal frame member 19 below the tractor body.

The inner wall 30 of the casting 25 is provided with a pair of longitudinally spaced apertures 72, each of which receives the hooked end of a counter-balancing spring 73, the inner ends of which are suitably connected to the tractor body. The purpose of these springs is, as is well known, to assist in raising the mower construction.

It will be noted from the foregoing description that the semi-circular construction of the shells 25 and 32 provide for nesting the shell 32 within the shell 25 and for generally enclosing at least portions of the shaft 60 and fly-wheel 62. Also, the forward end of the shell 25 serves to house or enclose a substantial portion of the spring-pressed release device 38. This form of construction, in addition to lending rigidity to the structure, provides also for a substantial enclosure of the moving parts against entanglement with hay or grain being cut. Other features and desirable characteristics of the invention will occur to those skilled in the art, as will numerous modifications and alterations. It is not desired that the scope of the invention be limited to the precise details of the preferred form of the invention shown and described.

What is claimed is.

1. An inner shoe construction for a mower, comprising: a longitudinal runner having a forward portion inclining upwardly and then turned back to extend longitudinally rearwardly above the forward portion; a longitudinal supporting member carried by the runner and including a bifurcated rear portion secured to a rear part of the runner and providing a pair of vertically spaced bearings alined on a vertical axis, and further having a forward portion secured to the aforesaid longitudinally rearwardly extending portion of the runner; means at a forward part of the member including a spring-pressed release device; a second member extending longitudinally between the rear and front ends of the first member, and including at its rear end a yoke having vertical spaced bearings alined on a vertical axis coincident with the vertical axis of the aforesaid bifurcated portion and pivoted thereto, and further including a forward portion releasably engaged by said spring-pressed device; and a drive shaft journaled in the second member on a horizontal axis and including a connecting portion within the yoke of said second member.

2. The invention set forth in claim 1, in which: the first member includes means by which said member may be connected to a mower coupling bar or like frame; and the second member is provided with a pair of longitudinally spaced bearings on a horizontal axis coaxial with the drive shaft and by means of which said second member may be connected to a mower cutter bar.

3. An inner shoe construction for a mower, comprising: a longitudinal runner; a longitudinal supporting member carried by the runner and including a bifurcated rear portion secured to a rear part of the runner and providing a pair of vertically spaced bearings alined on a vertical axis and further having a forward portion secured to a forward portion of the runner; means at a forward part of the member including a spring-pressed release device; a second member extending longitudinally between the rear and front ends of the first member, and including at its rear end a yoke having vertical spaced bearings alined on a vertical axis coincident with the vertical axis of the aforesaid bifurcated portion and pivoted thereto, and further including a forward portion releasably engaged by said spring-pressed device; and a drive shaft journaled in the second member on a horizontal axis and including a connecting portion within the yoke of said second member.

4. An inner shoe construction for a mower, comprising: a longitudinal runner; a longitudinal supporting member carried by the runner and including a bifurcated rear portion secured to a rear part of the runner and providing a pair of vertically spaced bearings alined on a vertical axis, and further having a forward portion secured to a forward portion of the runner; means at a forward part of the member including a spring-pressed release device; a second member extending longitudinally between the rear and front ends of the first member, and including at its rear end a portion having a bearing on a vertical axis coincident with the vertical axis of the aforesaid bifurcated portion and pivoted thereto, and further including a forward portion releasably engaged by said spring-pressed device; and a drive shaft journaled in the second member on a horizontal axis.

5. An inner shoe construction for a mower, comprising: a longitudinal runner for riding the ground; a supporting member carried by the runner and having a generally semi-cylindrical portion formed about a longitudinal, horizontal axis and open at the grassward side of the runner; a second member extending longitudinally of and generally within the semi-cylindrical portion of the first member; means pivoting the rear portion of the second member to the rear portion of the first member on a vertical pivot axis; means including a spring-pressed device connecting the front portion of the second member to a front portion of the first member; and a longitudinal driving shaft journaled on the second member and including an element rotatable therewith and a portion of which is generally within the semi-cylindrical portion of the first member.

6. The invention set forth in claim 5 in which: the closed stubbleward side of the first member includes means by which the shoe construction may be attached to a mower coupling bar or like supporting structure.

7. The invention set forth in claim 5 in which: the spring-pressed device is generally within the semi-cylindrical portion of the first member.

8. An inner shoe construction for a mower, comprising: a longitudinal runner for riding the ground; a supporting member carried by the runner and having a portion including a longitudinal inner or stubbleward wall and an upper wall connected thereto, said member being open at the grassward side of the runner; a second member extending longitudinally of and generally within the walls of the first member; means pivoting the rear portion of the second member to the rear portion of the first member on a vertical pivot axis; means including a spring-pressed device connecting the front portion of the second member to a front portion of the first member; and a longitudinal driving shaft journaled on the second member and including an element rotatable therewith and a portion of which is generally within the walls of the first member.

9. The invention set forth in claim 8 in which: the stubbleward wall of the first member includes means by which the shoe construction may be attached to a mower coupling bar or like supporting structure.

10. The invention set forth in claim 8 in which: the spring-pressed device is generally within the walls of the first member.

11. An inner shoe construction for a mower, comprising: a longitudinal runner for riding the ground; a supporting member carried by the runner and having a portion including a longitudinal inner or stubbleward wall and an upper wall connected thereto, said member being open at the grassward side of the runner; a second member extending longitudinally of and generally within the walls of the first member; means pivoting the rear portion of the second member to the rear portion of the first member on a vertical pivot axis; means including a spring-pressed device connecting the front portion of the second member to a front portion of the first member; and a longitudinal driving shaft journaled on the second member.

12. An inner shoe construction for a mower, comprising; a longitudinal runner for riding the ground; a supporting member carried by the runner and having a portion including a longitudinal inner or stubbleward wall and an upper wall connected thereto said member being open at the grassward side of the runner; a second member extending longitudinally of and generally within the walls of the first member; means connecting the rear portion of the second member to the rear portion of the first member; means connecting the front portion of the second member to a front portion of the first member and a longitudinal driving shaft journaled on the second member and including an element rotatable therewith and a portion of which is generally within the walls of the first member.

13. An inner shoe construction for a mower, comprising: a longitudinal ground-engaging runner; a longitudinal shell structure carried by the runner and having a closed stubbleward side and an open grassward side; means on the shell at its closed side for connecting the shell to a coupling bar or the like; a cutter bar extending grasswardly from the runner and shell; means connecting the stubbleward end of the cutter bar to the shell; a sickle carried by the cutter bar;

and a rotary drive element journaled generally within the shell and connected to the sickle.

14. An inner shoe construction for a mower, comprising: a longitudinal ground-engaging runner; a longitudinal shell structure carried by the runner and having a closed stubbleward side and an open grassward side; means on the shell at its closed side for connecting the shell to a coupling bar or the like; a second shell generally contained within the first shell and having an open grassward side; means connecting the shells together; a cutter bar, including a sickle, extending grasswardly from the runner and shells; means connecting the stubbleward end of the cutter bar to the inner shell; and a rotary drive element journaled generally within the second shell and connected to the sickle.

15. An inner shoe construction for a mower, comprising: a longitudinal ground-engaging runner; a longitudinal shell structure carried by the runner and having a closed stubbleward side and an open grassward side; means on the shell at its closed side for connecting the shell to a coupling bar or the like; a second shell generally contained within the first shell and having an open grassward side; means including a vertical pivot connecting the shells together for horizontal swinging of the second shell with respect to the first shell; means spaced longitudinally from the pivot means for releasably connecting the second shell against said horizontal swinging; a cutter bar, including a sickle, extending grasswardly from the runner and shells; means connecting the stubbleward end of the cutter bar to the second shell; and a rotary drive member journalled generally within the second shell and connected to the sickle.

SAMUEL E. HILBLOM.

REFERENCES CITED

The following references are of record in the file of this patent:

UNITED STATES PATENTS

| Number | Name | Date |
|---|---|---|
| 2,291,987 | Rogers | Aug. 4, 1942 |